(12) United States Patent
Tsubouchi

(10) Patent No.: US 12,444,773 B2
(45) Date of Patent: Oct. 14, 2025

(54) ALL-SOLID BATTERY

(71) Applicant: TOYOTA JIDOSHA KABUSHIKI KAISHA, Toyota (JP)

(72) Inventor: Hiroshi Tsubouchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 306 days.

(21) Appl. No.: 17/518,077

(22) Filed: Nov. 3, 2021

(65) Prior Publication Data

US 2022/0238922 A1 Jul. 28, 2022

(30) Foreign Application Priority Data

Nov. 17, 2020 (JP) ................................. 2020-190815

(51) Int. Cl.
*H01M 10/0585* (2010.01)
*H01M 4/02* (2006.01)
(Continued)

(52) U.S. Cl.
CPC ....... *H01M 10/0585* (2013.01); *H01M 4/386* (2013.01); *H01M 10/052* (2013.01);
(Continued)

(58) Field of Classification Search
CPC ........... H01M 10/0585; H01M 10/052; H01M 2004/027; H01M 2220/20; H01M 2300/0065; H01M 4/386
See application file for complete search history.

(56) References Cited

U.S. PATENT DOCUMENTS

2004/0214085 A1* 10/2004 Sheem ................. H01M 4/386
429/231.95
2013/0216907 A1 8/2013 Rayner et al.
(Continued)

FOREIGN PATENT DOCUMENTS

JP 2005-135925 A 5/2005
JP 2005-310759 A 11/2005
(Continued)

OTHER PUBLICATIONS

Zhu, Pengcheng et al., Insights into Architecture, Design, and Manufacture of Electrodes for Lithium-Ion Batteries, Nov. 2022, Materials & Design, vol. 223, 111208 (Year: 2022).*
(Continued)

*Primary Examiner* — Ula C Ruddock
*Assistant Examiner* — Olivia Mason Ruggiero
(74) *Attorney, Agent, or Firm* — Dinsmore & Shohl LLP

(57) ABSTRACT

Provided is an all-solid battery that can reduce electrical resistance after a cycle. The all-solid battery includes a cathode layer, an anode layer, and a solid electrolyte layer. The solid electrolyte layer is formed between the cathode layer and the anode layer. The anode layer contains a Si-based active material. The Si-based active material is a secondary particle having a plurality of primary particles. When a sum of void volume inside the primary particles included in the secondary particle is set to $V_{V1}$ and a sum of void volume between the primary particles included in the secondary particle is set to $V_{V2}$, a ratio of the $V_{V1}$ to the $V_{V2}$ calculated by $V_{V1}/V_{V2}$ is 0.8 or more and 5 or less.

3 Claims, 3 Drawing Sheets

(51) Int. Cl.
*H01M 4/38* (2006.01)
*H01M 10/052* (2010.01)

(52) U.S. Cl.
CPC ............... *H01M 2004/021* (2013.01); *H01M 2004/027* (2013.01); *H01M 2220/20* (2013.01); *H01M 2300/0065* (2013.01)

(56) References Cited

U.S. PATENT DOCUMENTS

| | | |
|---|---|---|
| 2014/0030597 A1 | 1/2014 | Jung et al. |
| 2016/0028084 A1 | 1/2016 | Lee et al. |
| 2018/0097229 A1* | 4/2018 | Jo .................... H01M 4/364 |
| 2020/0119340 A1* | 4/2020 | Jang ............... H01M 10/446 |
| 2020/0161635 A1* | 5/2020 | Liu .................... H01M 4/366 |
| 2021/0408527 A1 | 12/2021 | Kim et al. |

FOREIGN PATENT DOCUMENTS

| | | |
|---|---|---|
| JP | 2013-235682 A | 11/2013 |
| JP | 2014-026950 A | 2/2014 |
| JP | 2014-123575 A | 7/2014 |
| JP | 2017-054720 A | 3/2017 |
| JP | 2018-120866 A | 8/2018 |
| JP | 2020087882 A * | 6/2020 |
| KR | 10-2020-0065562 A | 6/2020 |

OTHER PUBLICATIONS

Kim et al., "Possibility of Recycling SiOx Particles Collected at Silicon Ingot Production Process as an Anode Material for Lithium Ion Batteries", Scientific Reports, 9:13313, 2019 https://doi.org/10.1038/s41598-019-50011-8.

* cited by examiner

ALL-SOLID BATTERY

CROSS-REFERENCE TO RELATED APPLICATION

This application claims priority to Japanese Patent Application No. 2020-190815 filed on Nov. 17, 2020, incorporated herein by reference in its entirety.

TECHNICAL FIELD

The present disclosure relates to an all-solid battery.

BACKGROUND ART

An all-solid battery is a battery that has a solid electrolyte layer between a cathode and an anode and has an advantage that simplification of a safety device can be easily devised as compared with a liquid-based battery having an electrolytic solution containing a flammable organic solvent.

Patent Document 1 discloses that a Si-based active material is made to be porous, volume expansion rate is reduced, and the lifespan of a battery is improved.

Patent Document 2 discloses that the Si-based active material is a secondary particle having a plurality of primary particles, and when the volume of the secondary particle is $V_P$ and the void volume of the secondary particle is $V_V$, the ratio of $V_V$ to $V_P$ ($V_V/V_P$) is 0.3 or more and 0.6 or less.

Patent Document 1: JP2018-120866A
Patent Document 2: JP2020-087882A

Since the Si-based active material greatly varies in volume during charging and discharging, electrical resistance easily increases due to cracking and the like by repeating the charging and discharging cycle. Even in the prior art, the electrical resistance after the cycle being large is a problem. This disclosure has been made in consideration of the above-described actual condition, and a main object of which is to provide the all-solid battery that can reduce the electrical resistance after the cycle.

SUMMARY

To solve the above-described problem, this application discloses an all-solid battery that includes a cathode layer, an anode layer, and a solid electrolyte layer. The solid electrolyte layer is formed between the cathode layer and the anode layer. The anode layer contains a Si-based active material. The Si-based active material is a secondary particle having a plurality of primary particles. When a sum of void volume inside the primary particles included in the secondary particle is set to $V_{V1}$ and a sum of void volume between the primary particles included in the secondary particle is set to $V_{V2}$, a ratio of the $V_{V1}$ to the $V_{V2}$ calculated by $V_{V1}/V_{V2}$ is 0.8 or more and 5 or less.

The all-solid battery this application discloses can reduce the resistance after the cycle.

DESCRIPTION OF EMBODIMENTS

The following describes an all-solid battery of this disclosure in detail.

Figure 1:
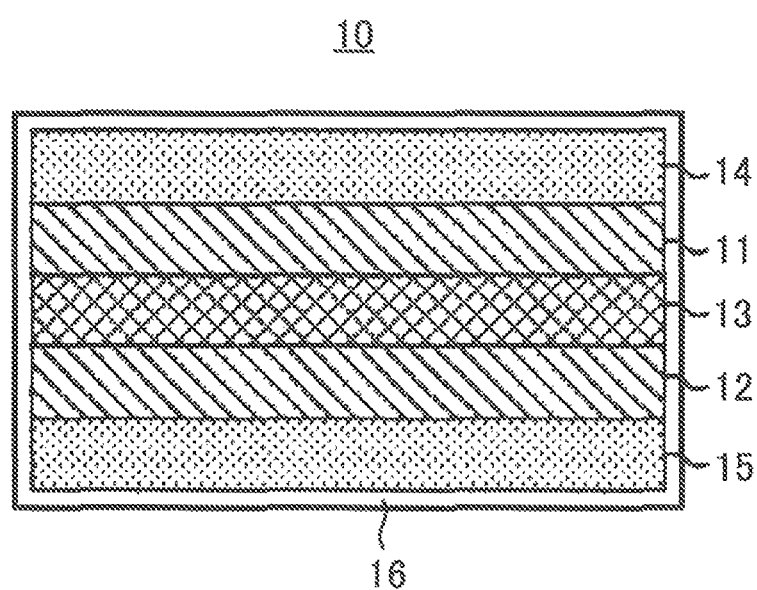
FIG. 1 is a schematic cross-sectional view of an all-solid battery 10.
Figure 2:
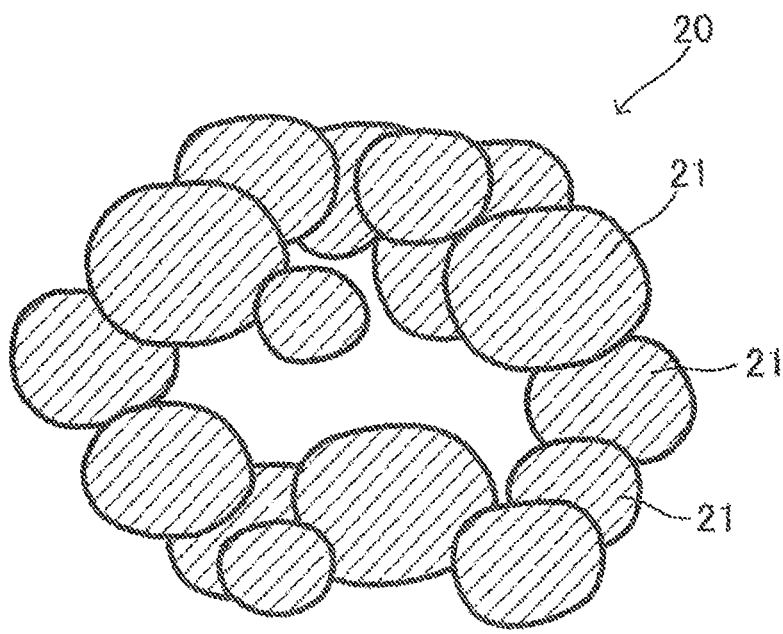
FIG. 2 is a view schematically illustrating one secondary particle 20.

FIG. 1 is a schematic cross-sectional view illustrating one example of the all-solid battery in this disclosure. Further, FIG. 2 is an image view of the cross section of one certain Si-based active material 20 (secondary particle 20) in this disclosure. The all-solid battery 10 illustrated in FIG. 1 has a cathode layer 12, an anode layer 11, and a solid electrolyte layer 13 arranged between the cathode layer 12 and the anode layer 11. Furthermore, the all-solid battery 10 has a cathode current collector 15 that collects current of the cathode layer 12 and an anode current collector 14 that collects current of the anode layer 11. The following describes each configuration.

1. Anode Layer

The anode layer 11 is a layer containing at least an anode active material.

The anode layer 11 contains the Si-based active material 20 as the anode active material. The Si-based active material 20 is an active material that can be alloyed with Li. Examples of the Si-based active material 20 include a Si simple substance, a Si alloy, and a Si oxide. The Si alloy contains a Si element as a main component. The proportion of the Si element in the Si alloy may be, for example, 50 mol % or more, may be 70 mol % or more, or may be 90 mol % or more.

Examples of the Si oxide include $SiO_2$.

The Si-based active material 20 is the secondary particle 20 having a plurality of primary particles 21 as illustrated in FIG. 2.

Here, for the Si-based active material 20, when a sum of void volume inside the primary particles 21 included in the secondary particle 20 is set to $V_{V1}$ and a sum of the void volume between the primary particles 21 included in the secondary particle 20 is set to $V_{V2}$, the ratio of $V_{V1}$ to $V_{V2}$ calculated by $V_{V1}/V_{V2}$ is 0.8 or more and 5 or less. This can lower the initial electrical resistance while maintaining (or improving) suppressing effect of expansion and contraction of the Si-based active material 20. This is considered to be because the area of a contact interface between the Si particle and the solid electrolyte expands and a solid diffusion distance inside the Si decreases. This can reduce the electrical resistance value after a cycle. $V_{V1}/V_{V2}$ is 1 or more, or 1.5 or more. Further, $V_{V1}/V_{V2}$ is 5 or less, or 3 or less.

When $V_{V1}/V_{V2}$ becomes large, pores appear even on the surface of the primary particles 21, a specific surface area becomes large, and a reactive area increases, which is considered to reduce the electrical resistance. Furthermore, since a true specific gravity of the primary particles 21 becomes small, the number of particles increases and the reactive area increases as long as the design has the same capacity, which is considered to reduce the electrical resistance. Further, the voids in the primary particles 21 can absorb the expansion of the primary particles 21 themselves to some extent, and even if the ratio of $V_{V2}$ becomes small by that amount, it is considered that the expansion as the secondary particle 20 can be controlled. However, when $V_{V1}/V_{V2}$ exceeds 5, the true specific gravity of the primary particles 21 becomes small, and thus, with the design having the same capacity, the number of particles increases, a film thickness becomes too thick. Accordingly, the electrical resistance in the thickness direction increases, the region which absorbs the expansion as the secondary particle 20 becomes small, cycle deterioration is likely to occur, and the resistance after the cycle increases. On the other hand, when $V_{V1}/V_{V2}$ is smaller than 0.8, the reactive area becomes relatively small, and the initial electrical resistance increases, leading to the increase in the resistance after the cycle.

$V_{\nu 1}$ and $V_{\nu 2}$ can be obtained, for example, as follows.

That is, the secondary particle 20 includes roughly divided 3 volume voids of $V_{\nu 1}$, $V_{\nu 2}$, and other $V_\alpha$, and the respective volume can be obtained by isolating these in the following way.

(1) All the void volume included in the secondary particle 20 is obtained by the gas absorption. This is $V_{\nu 1}+V_{\nu 2}+V_\alpha$.

(2) The secondary particle 20 is crashed to the primary particle level and the void volume is obtained by gas absorption. Since this represents $V_{\nu 1}$, this is defined as $V_{\nu 1}$.

(3) Therefore, $V_{\nu 2}+V_\alpha$, can be also obtained from (1) and (2).

(4) An area which belongs to $V_{\nu 2}$ and an area which belongs to $V_\alpha$, are obtained by SEM image processing of the cross section of the secondary particle 20. This is regarded as the volume ratio of $V_{\nu 2}$ and $V_\alpha$, and from this, $V_{\nu 2}$ is obtained.

Further, in this disclosure, when a long side length of the primary particle 21 is set to a, a short side length is set to b, and the ratio of b to a is set to b/a, the value of b/a is, for example, 0.5 or more, may be 0.6 or more, or may be 0.8 or more. On the other hand, the value of b/a may be 1, or may be less than 1. When this kind of primary particle 21 is used, an all-solid battery having more satisfactory cycle characteristics can be obtained.

The long side length a and the short side length b can be obtained by measuring the cross-sectional image of the primary particles 21. Specifically, one primary particle 21 is specified from the cross-sectional image, a straight line is drawn in a specified region, and the longest portion in the length is defined as the long side a. On the other hand, the portion which is perpendicular to the long side a and the shortest in the length is defined as the short side b. From these values, b/a is obtained. This operation is also performed on other primary particles 21 to obtain an average value of b/a. The number of samples is large, is, for example, 20 or more, may be 50 or more, or may be 100 or more.

Although an average grain diameter ($D_{50}$) of the primary particles 21 is not specifically limited, the average grain diameter ($D_{50}$) is, for example, 50 nm or more, or may be 100 nm or more. On the other hand, the average grain diameter ($D_{50}$) of the primary particles is, for example, 1 μm or less, or may be 500 nm or less.

The Si-based active material 20 in this embodiment may contain a needle-shaped conductive material between the plurality of primary particles 21. Here, the needle shape means an elongated shape in which the length of the long side is twice or more the length of the short side. Further, the needle shape may be a linear shape or a curved shape and can be said as a rod shape or a fibrous shape. Further, a plurality of needle-shaped conductive materials may be tangled to be present. Such a conductive material plays a role of a filler by existing between the plurality of primary particles 21 and is estimated to impose a positive effect on maintaining framework of the Si-based active material 20 when the Si-based active material 20 expands and contracts.

Although the conductive material is not particularly limited as long as it is needle-shaped, examples include VGCF (gas phase method carbon fiber), CNT (carbon nanotube), and the like.

In the needle-shaped conductive material, the length of the long side is twice or more the length of the short side, and for example, may be 10 times or more, or may be 50 times or more. On the other hand, the length of the long side may be 500 times or less the length of the short side or may be 100 times or less.

The long side of the needle-shaped conductive material is, for example, 5 μm or more and 15 μm or less. Further, the short side of the needle-shaped conductive material is, for example, 50 nm or more and 200 nm or less.

The Si-based active material 20 may contain a conductive material having other shape than the needle shape, such as a granular shape. Examples of the granular-shaped conductive material include acetylene black (AB), Ketjen black (KB), and the like.

When the needle-shaped conductive material is contained in the Si-based active material 20, a proportion is not specifically limited. However, for example, the proportion is 0.5 weight % or more, and may be 1 weight % or more. Further, the proportion of the conductive material is, for example, 10 weight % or less, or may be 5 weight % or less. If the proportion of the conductive material is too small, the effect of including the conductive material may not be sufficiently enjoyed. On the other hand, if the proportion of the conductive material is too large, productivity may get worse.

In the Si-based active material 20, a binder may exist between the adjacent primary particles 21. Examples of the binder include polyimide. Further, a common binder used for the anode layer may be used. The proportion of the binder included in the Si-based active material 20 is, for example, 0.5 weight % or more, and may be 1 weight % or more. On the other hand, the proportion of the binder included in the Si-based active material is, for example, 5 weight % or less.

The Si-based active material 20 can be produced, for example, as follows.

For the primary particles 21, for example, by mixing Li and Si in a mortar to prepare LiSi alloy and treating this LiSi alloy with ethanol, the primary particles 21 which are porous (have the voids constituting $V_{\nu 1}$) can be obtained.

A slurry containing the obtained primary particles 21, a conductive material (also referred to as a first conductive material), a binder, and a dispersion medium is prepared. Here, examples of the binder include a high strength binder, such as polyimide (for example, 1 weight % or more and 5 weight % or less with respect to Si), and examples of the dispersion medium include water. Further, examples of a method of forming the slurry include a method of kneading a mixture containing the primary particles 21, the first conductive material, the binder, and the dispersion medium using a kneading device, such as a planetary mixer. A solid content concentration of the slurry is, for example, 5 weight % or more and 30 weight % or less.

Next, the obtained slurry is processed by granulation to turn to secondary particles. Examples of the granulation processing include a process using a nozzle type spray dryer. The amount of solution sending is, for example, 20 mL/h or more and 200 mL/h or less. The spray gas pressure is, for example, 0.1 MPa or more and 0.4 MPa or less. Further, the drying temperature is, for example, 140° C. or more and 200° C. or less. Further, for example, when the slurry contains a polyimide precursor as the binder, heat treatment is performed after the granulation process to form the polyimide. The heat treatment temperature is, for example, 250° C. or more and 350° C. or less. The heat treatment period is, for example, 1 hour or more and 10 hours or less. The heat treatment atmosphere is an inert atmosphere or a vacuum. This is because oxidation of the Si-based active material can be prevented.

The void (void constituting $V_{r2}$) of the Si-based active material 20 (secondary particle 20) can be adjusted by appropriately setting manufacturing conditions. For example, when the solid content of the slurry reduces, the void tends to increase. On the other hand, for example, when the binder amount increases, the void tends to decrease.

The anode layer 11 may contain only the Si-based active material 20 as the anode active material or may contain other active materials. In the latter case, the proportion of the Si-based active material in all the anode active materials may be 50 weight % or more, may be 70 weight % or more, or may be 90 weight % or more.

The proportion of the anode active material in the anode layer 11 is, for example, 20 weight % or more, may be 30 weight % or more, or may be 40 weight % or more. On the other hand, the proportion of the anode active material in the anode layer is 95 weight % or less, may be 90 weight % or less, or may be 80 weight % or less.

Further, the anode layer 11 may contain at least one of the solid electrolyte and the binder, as necessary. Examples of the above-described solid electrolyte include inorganic solid electrolytes, such as a sulfide solid electrolyte, an oxide solid electrolyte, a nitride solid electrolyte, and a halide solid electrolyte. Examples of the sulfide solid electrolyte include an Li element, an X element (X is at least one kind of P, Si, Ge, Sn, B, Al, Ga, and In), and a solid electrolyte containing an S element. Further, the sulfide solid electrolyte may further contain at least one of an O element and a halogen element. Further, examples of the oxide solid electrolyte include the Li element, a Y element (Y is at least one kind of Nb, B, Al, Si, P, Ti, Zr, Mo, W, and S), and the solid electrolyte containing the O element. Further, examples of the nitride solid electrolyte include $Li_3N$, and examples of the halide solid electrolyte include LiCl, LiI, and LiBr. Examples of the above-described binder include rubber-based binders, such as butylene rubber (BR) and styrene butadiene rubber (SBR), and fluoride-based binders, such as polyvinylidene fluoride (PVDF).

Further, the anode layer 11 may contain a second conductive material other than the conductive material (first conductive material) contained in the Si-based active material 20. Examples of the second conductive material include a carbon material. Examples of the carbon material include particle-shaped carbon materials, such as acetylene black and Ketjen black, and fibrous-shaped carbon materials, such as a carbon fiber, a carbon nanotube, and a carbon nanofiber. The second conductive material may be different from or may be the same as the first conductive material.

When the anode layer 11 contains the first conductive material and the second conductive material, the proportion of the first conductive material in all the conductive materials inside the anode layer may be 50 weight % or more, may be 70 weight % or more, or may be 90 weight % or more.

The thickness of the anode layer 11 is, for example, 0.1 μm or more and 1000 μm or less. Examples of a method of forming the anode layer include a method of applying and drying the above-described slurry which contains at least the Si-based active material and the dispersion medium and has turned to the secondary particles. Note that it is only necessary to add the second conductive material when preparing the above-described slurry.

2. Cathode Layer

The cathode layer 12 is a layer containing at least a cathode active material. Further, the cathode layer 12 may contain at least one of the solid electrolyte, the conductive material, and the binder, as necessary.

Examples of the cathode active material include an oxide active material. Examples of the oxide active material include rock salt layer type active materials, such as $LiCoO_2$, $LiMnO_2$, $LiNiO_2$, $LiVO_2$, and $LiNi_{1/3}Co_{1/3}Mn_{1/3}O_2$, spinel type active materials, such as $LiMn_2O_4$ and $Li(Ni_{0.5}Mn_{1.5})O_4$, and olivine type active materials, such as $LiFePO_4$, $LiMnPO_4$, $LiNiPO_4$, and $LiCoPO_4$. Further, on a surface of the cathode active material, a coat layer containing an Li ionic conductive oxide may be formed. This is because a reaction between the cathode active material and the solid electrolyte can be suppressed.

Examples of a shape of the cathode active material include a particle shape. Although an average secondary particle ($D_{50}$) of the cathode active material is not specifically limited, the average secondary particle ($D_{50}$) is, for example, 10 nm or more, or may be 100 nm or more. On the other hand, the average secondary particle diameter ($D_{50}$) of the cathode active material is, for example, 50 μm or less, or may be 20 μm or less.

The proportion of the cathode active material in the cathode layer 12 is, for example, 20 weight % or more, may be 30 weight % or more, or may be 40 weight % or more. On the other hand, the proportion of the cathode active material is, for example, 80 weight % or less, may be 70 weight % or less, or may be 60 weight % or less.

For the solid electrolyte and the binder used in the cathode layer 12, since the explanation is the same as the content described in the anode layer 11 above, the description thereof is omitted here.

Examples of the conductive material include a carbon material. Examples of the carbon material include particle-shaped carbon materials, such as acetylene black and Ketjen black, and fibrous-shaped carbon materials, such as a carbon fiber, a carbon nanotube, and a carbon nanofiber.

The thickness of the cathode layer 12 is, for example, 0.1 μm or more and 1000 μm or less. Examples of a method of forming the cathode layer include a method of applying and drying a slurry containing at least the cathode active material and a dispersion medium.

3. Solid Electrolyte Layer

The solid electrolyte layer 13 is a layer arranged between the cathode layer and the anode layer. The solid electrolyte layer 13 contains at least a solid electrolyte and may contain a binder, as necessary. For the solid electrolyte and the binder, since the explanation is the same as the anode layer 11 above, the description thereof is omitted here. Above all, the solid electrolyte layer contains the sulfide solid electrolyte as the solid electrolyte.

The thickness of the solid electrolyte layer 13 is, for example, 0.1 μm or more and 1000 μm or less. Examples of a method of forming the solid electrolyte layer 13 include a method of compression molding of the solid electrolyte.

4. Other Members

The all-solid battery 10 in this embodiment has at least the anode layer 11, the cathode layer 12, and the solid electrolyte layer 13 as described above. Furthermore, usually, the all-solid battery 10 has the cathode current collector 15 that collects current of the cathode layer 12 and the anode current collector 14 that collects current of the anode layer 11. Examples of a material of the cathode current collector 15 include stainless steel, aluminum, nickel, iron, titanium, and carbon. On the other hand, examples of a material of the anode current collector 14 include stainless steel, copper, nickel, and carbon. Note that the thicknesses and shapes of the cathode current collector 15 and the anode current collector 14 are selected appropriately according to an application of the battery. Further, the all-solid battery 10 may have a battery case 16 which houses the anode layer 11, the cathode layer 12, and the solid electrolyte layer 13 as described above.

5. All-Solid Battery

In some embodiments, the all-solid battery in this disclosure is an all-solid lithium battery. Further, although the all-solid battery in this disclosure may be a primary battery or may be a secondary battery as the secondary battery can be charged and discharged repeatedly and is useful as, for example, an on-vehicle battery. Further, the all-solid battery in this disclosure may be a single battery or may be a laminated battery. The laminated battery may be a monopolar type laminated battery (parallel connection type laminated battery) or may be a bipolar type laminated battery (series connection type laminated battery). Examples of the shape of the all-solid battery include a coin type, a laminated type, a cylindrical type, and a square type.

Note that the aspect of this disclosure is not limited to the above embodiment. The above embodiment is only illustrative. The technical scope of this disclosure encompasses any technology as long as the technology has substantially the same configuration as those of the technical ideas recited in the appended claims of this disclosure and provides similar operational advantages.

WORKING EXAMPLE

[Preparation of a Cathode Structure]

A cathode active material ($LiNi_{1/3}Co_{1/3}Mn_{1/3}O_2$) and a sulfide solid electrolyte ($Li_2S$—$P_2S_5$) were weighed so that the volume ratio of the cathode active material to the sulfide solid electrolyte became 75 to 25. Further, a PVDF binder was weighed to be 1.5 weight parts with respect to 100 weight parts of the cathode active material, and a conductive auxiliary agent (VGCF, manufactured by Showa Denko) was weighed to be 3.0 weight parts with respect to 100 mass parts of the cathode active material. These materials were mixed and adjusted so that the solid content became 63 weight %. Afterwards, these materials were kneaded for 1 minute using an ultrasonic sound wave homogenizer to obtain a cathode composition in a slurry state. The obtained cathode composition was applied on the surface of a cathode current collector (aluminum foil, manufactured by Showa Denko), and underwent the process of drying by heating to form a cathode. The cathode was roll-pressed at 25° C. and at a linear pressure of 1 ton/cm to obtain a cathode structure having the cathode current collector and a cathode layer.

[Preparation of an Anode Active Material]

Li and Si were mixed in a mortar to prepare a LiSi alloy and this LiSi alloy was treated with ethanol to obtain porous primary particles.

The prepared primary particles, a conductive material having a length of 6 μm and a diameter of 150 nm (VGCF, manufactured by Showa Denko), a polyimide precursor (polyamic acid), and water were mixed and kneaded with a planetary mixer to obtain a slurry. The obtained slurry was dried using a nozzle type spray dryer to turn to secondary particles. Afterwards, the slurry underwent heat treatment under an inert atmosphere to obtain an Si-based active material.

For the obtained Si-based active material, $V_{\nu 1}/V_{\nu 2}$ was obtained. Table 1 shows $V_{\nu 1}/V_{\nu 2}$ in Working example 1 to Working example 5, Comparative example 1, and Comparative example 2. Adjustment of $V_{\nu 1}/V_{\nu 2}$ in each Working example were conducted by adjusting $V_{\nu 1}$ by the mixing ratio of Li and Si and the ethanol treatment speed, and by adjusting $V_{\nu 2}$ by the spray pressure and the drying speed of the spray dryer.

[Preparation of an Anode Structure]

The prepared Si-based active material and the sulfide solid electrolyte ($Li_2S$—$P_{255}$) were weighed so that the volume ratio of the anode active material to the sulfide solid electrolyte became 60 to 40. Further, the PVDF binder was weighed to be 1.5 weight parts with respect to 100 weight parts of the Si-based active material, and the conductive auxiliary agent (VGCF) was weighed to be 3.0 weight parts with respect to 100 weight parts of the Si-based active material. These materials were mixed and adjusted so that the solid content became 45 weight %. Afterwards, these materials were kneaded for 1 minute using the ultrasonic sound wave homogenizer to obtain an anode composition in a slurry state. The obtained anode composition was applied on the surface of an anode current collector (nickel foil) using an applicator and dried by heating. Afterwards, it was roll-pressed at 25° C. and at a linear pressure of 1 ton/cm to obtain an anode structure having the anode current collector and an anode layer. Although $V_{\nu 1}/V_{\nu 2}$ shown in Table 1 is a measurement result before pressing, it has been confirmed by the inventor that $V_{\nu 1}/V_{\nu 2}$ hardly varies before and after pressing.

[Preparation of a Battery]

The sulfide solid electrolyte ($Li_2S$—$P_2S_5$) and the PVDF binder were weighed so that the PVDF binder became 1 mass part with respect to 100 weight parts of the sulfide solid electrolyte, they were blended so that the solid content became 63 mass %, and they were kneaded for 1 minute using the ultrasonic sound wave homogenizer to prepare a separator composition in a slurry state. Afterwards, the separator composition in the slurry state was applied on the surface of the aluminum foil and underwent the process of drying by heating to form a separator layer. Next, the separator layer was transferred to the cathode structure and had the anode structure further transferred to prepare the separator layer and a battery cell.

[Evaluation]

Figure 3:
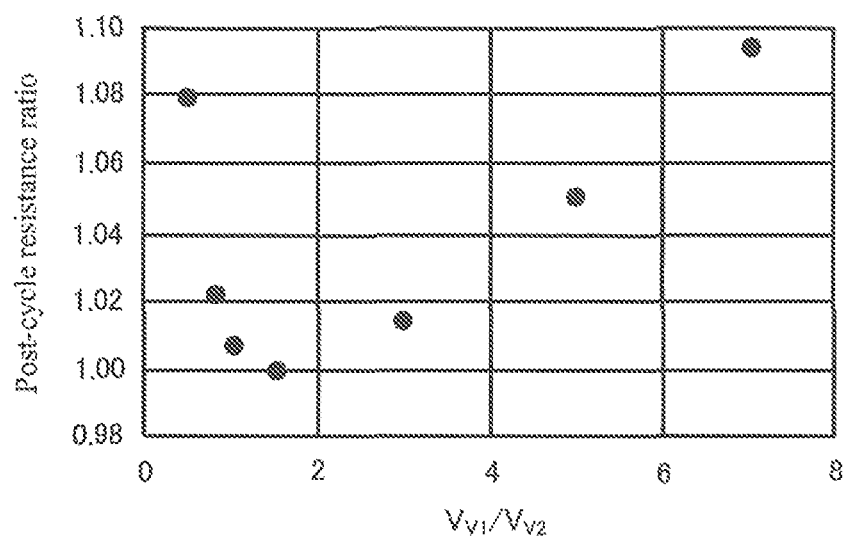
FIG. 3 is a graph representing the result of working examples and comparative examples.

The batteries obtained in Working example 1 to Working example 5, Comparative example 1, and Comparative example 2 were charged and discharged for 500 cycles by from 3.0 V to 4.2 V, and resistance values at the 500th cycle were defined as post-cycle resistance values. Here, the resistance value was obtained from a voltage difference (ΔV) when the battery was discharged for 1 second from SOC (state of charge) 20% at 4 C (C rate). Then, by defining the post-cycle resistance value of Working example 3 as 1.0, the ratio to the post-cycle resistance value of each example (post-cycle resistance ratio) was obtained. Table 1 shows the result. Further, FIG. 3 shows a graph representing $V_{\nu 1}/V_{\nu 2}$ on the horizontal axis and the post-cycle resistance ratio on the vertical axis.

TABLE 1

(Table 1)

| | $V_{\nu 1}/V_{\nu 2}$ | Post-cycle resistance ratio |
|---|---|---|
| Working example 1 | 5.0 | 1.05 |
| Working example 2 | 3.0 | 1.01 |
| Working example 3 | 1.5 | 1.00 |
| Working example 4 | 1.0 | 1.01 |
| Working example 5 | 0.8 | 1.02 |
| Comparative example 1 | 7.0 | 1.09 |
| Comparative example 2 | 0.5 | 1.08 |

As Table 1 and FIG. 3 suggest, the post-cycle resistance ratio was able to be reduced by setting $V_{V1}/V_{V2}$ to be from 0.8 to 5.0.

DESCRIPTION OF REFERENCE SIGNS

10 All-solid battery
11 Cathode layer
12 Anode layer
13 Solid electrolyte layer
14 Cathode current collector
15 Anode current collector

The invention claimed is:

1. An all-solid battery comprising:
a cathode layer;
an anode layer; and
a solid electrolyte layer formed between the cathode layer and the anode layer, wherein
the anode layer contains a Si-based active material,
the Si-based active material comprises a plurality of secondary particles each having a plurality of primary particles, and
when a sum of void volume inside the primary particles included in an individual secondary particle of the plurality of secondary particles is set to $V_{V1}$ and a sum of void volume between the plurality of the primary particles included in the individual secondary particle is set to $V_{V2}$, a ratio of the $V_{V1}$ to the $V_{V2}$ calculated by $V_{V1}/V_{V2}$ is 0.8 or more and 5 or less.

2. The all-solid battery of claim 1, wherein an average diameter of the primary particles is from 50 nm to 1 μm.

3. The all-solid battery of claim 1, wherein the ratio of the $V_{V1}$ to the $V_{V2}$ calculated by $V_{V1}/V_{V2}$ is 0.8 or more and 3 or less.

* * * * *